F. CONRAD.
RECTIFIER SYSTEM.
APPLICATION FILED JUNE 21, 1912.

1,112,266.

Patented Sept. 29, 1914.
2 SHEETS—SHEET 1.

WITNESSES:
INVENTOR
Frank Conrad
BY
ATTORNEY

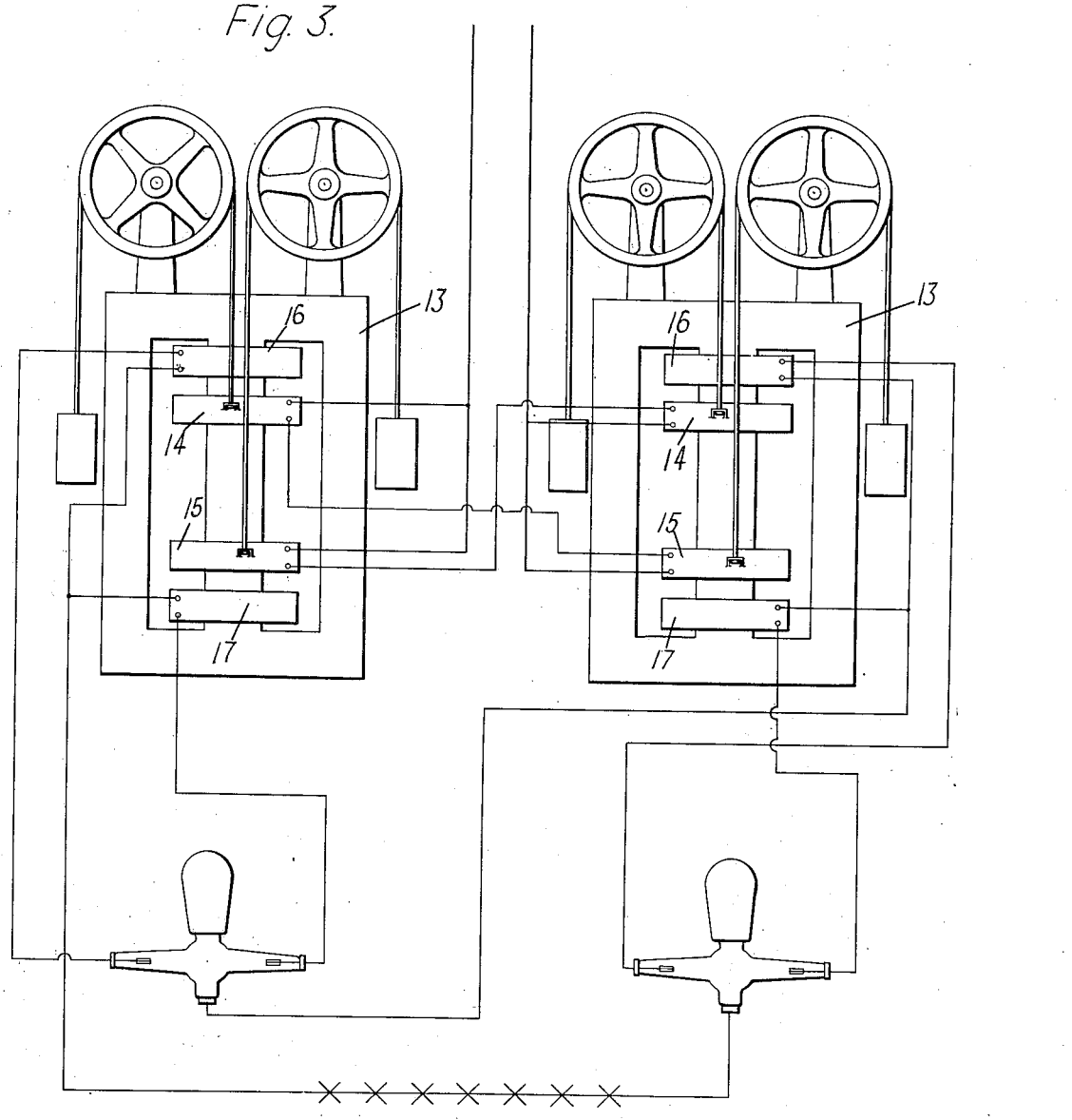

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

RECTIFIER SYSTEM.

1,112,266.     Specification of Letters Patent.     Patented Sept. 29, 1914.

Application filed June 21, 1912. Serial No. 705,038.

*To all whom it may concern:*

Be it known that I, FRANK CONRAD, a citizen of the United States, and a resident of Swissvale, in the county of Allegheny and State of Pennsylvania, have invented a new and useful Improvement in Rectifier Systems, of which the following is a specification.

My invention relates to systems of distribution in which alternating currents are rectified, and particularly to such systems as involve the use of mercury vapor or similar rectifiers.

The object of my invention is to provide a system of the character indicated in which the current that flows upon the occurrence of a short circuit in the rectifying apparatus is limited to a harmless value. The means for limiting the short circuit current also renders the occurrence of the short circuits themselves difficult and infrequent.

Figure 1:
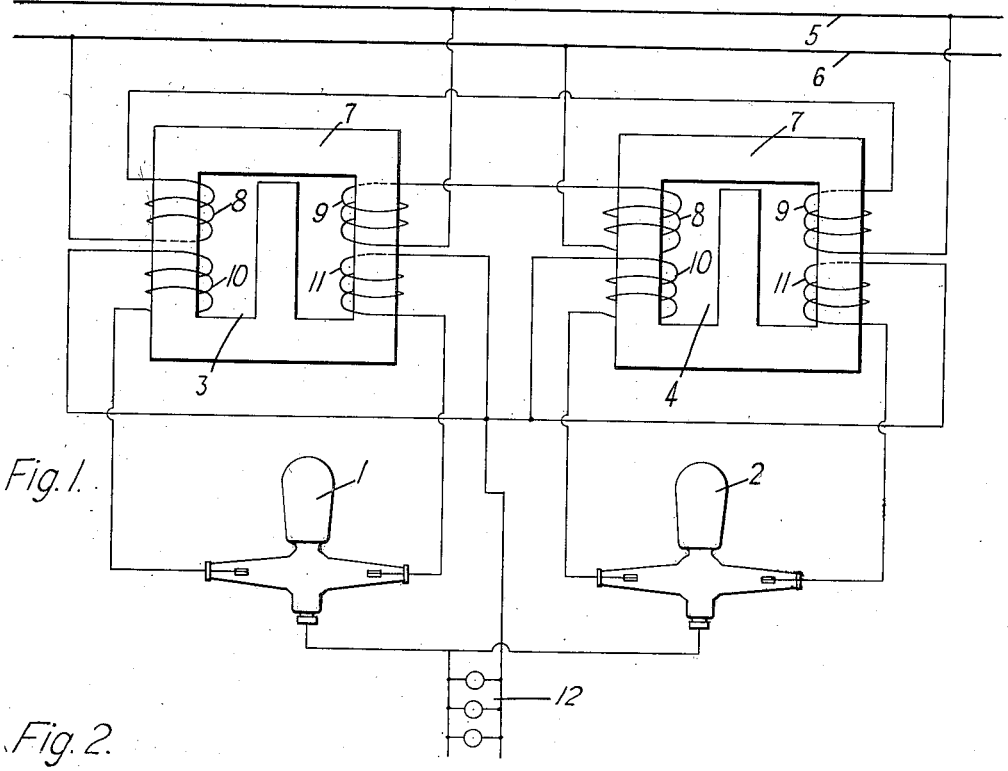
Figure 2:
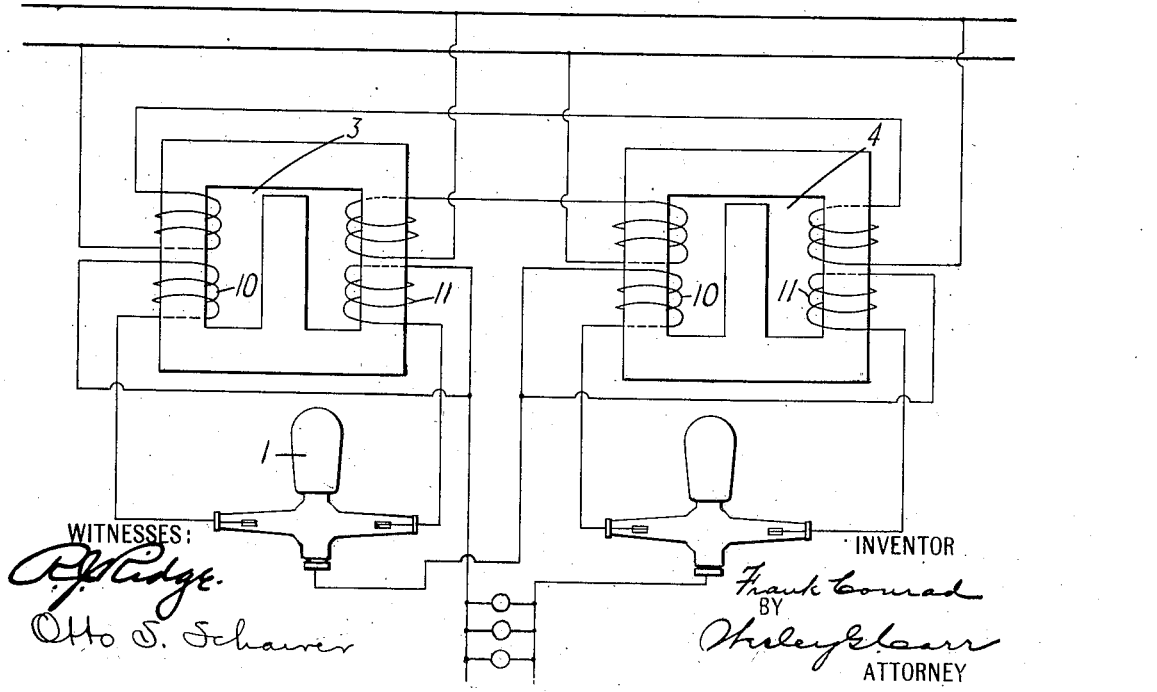

My invention is illustrated in the accompanying drawings, Figure 1 of which is a diagrammatic view of a system of distribution embodying the same, and Figs. 2 and 3 are similar views of modifications of the system of Fig. 1.

The system of the present invention comprises two current rectifiers 1 and 2 of any suitable form, such as mercury vapor devices, and two transformers 3 and 4 through which alternating current is supplied to the rectifiers from a suitable supply circuit 5—6. Each of the transformers comprises a magnetizable core 7, having three legs, the middle leg of which is preferably provided with an air gap. The primary and secondary windings of each transformer comprise two coils 8 and 9, and 10 and 11, respectively, that are located upon the outer legs of the core, one coil of each winding being located upon each leg. The primary coils are series connected in pairs, with one coil of each transformer in each pair, and the pairs are connected in parallel relation to the supply circuit 5—6.

One terminal of each secondary coil is connected to one terminal of a suitable distributing circuit 12, and the remaining terminals are respectively connected to the anodes of the rectifiers, the coils of the respective transformers being connected to the anodes of the same rectifier. The cathodes of the rectifier are connected to the other terminal of the distributing circuit.

In the normal operation of the system, alternate half cycles of the alternating current traverse the coils 10 of the two transformers simultaneously, and the other half cycles traverse the coils 11 simultaneously. However, if a short circuit occurs in the rectifier 1, for instance, currents will traverse the coils 10 and 11 of the transformer 3 simultaneously, and these currents induce other currents in the corresponding primary coils which tend to distort the wave form of the primary current, with the result that high impedance is offered to the flow of the short circuit current.

In the system of Fig. 1, the rectifiers are connected in parallel relation, but in Fig. 2, they are connected so that the current traverses them in series relation, the differences in the connections being that the cathode of the rectifier 1 is connected to terminals of the coils 10 and 11 of the transformer 4 and one terminal of the distributing circuit is connected to the terminals of the secondary coils 10 and 11 of the transformer 3. The operation of the system of Fig. 2 is similar to that of Fig. 1.

The present system is adapted for use with two regulating transformers, whereby the current supplied to a distributing circuit through the rectifiers is maintained substantially uniform in value, as shown in Fig. 3. Each of the regulating transformers comprises a core 13 having three legs, the middle leg of which is surrounded by both the primary and the secondary coils, the primary coils 14 and 15 being disposed and movable between the secondary coils 16 and 17 and being caused to move simultaneously and correspondingly by means of suitable mechanical connections between them. The connections of the coils are substantially the same as in the systems of the preceding figures, and the operation of the system is also similar.

I claim as my invention:

1. The combination with two transformers each having two primary coils that are series connected in pairs, with one coil of each transformer in each pair, of two rectifying devices each of which is supplied from a secondary winding of each transformer.

2. The combination with two transformers each having two primary coils that are series connected in pairs, with one coil of each transformer in each pair, of two rectifying devices supplied from the secondary windings of the said transformers, the anodes of the several rectifiers being connected to the secondary terminals of the respective transformers.

3. The combination with two transformers each having two primary coils that are series connected in pairs, with one coil of each transformer in each pair, of two rectifying devices supplied from the secondary windings of the transformers.

4. The combination with two transformers each comprising a core having a plurality of legs, and a primary and a secondary coil upon each of several legs the primary coils being series connected in pairs, of two rectifying devices supplied from the secondary windings of the transformers.

5. The combination with two transformers each comprising a core having a plurality of legs, and a primary and a secondary coil upon each of several legs the primary coils being series connected in pairs, of two rectifying devices each of which is supplied from a secondary winding of each transformer.

6. The combination with two transformers each comprising a core having a plurality of legs and a leakage path, and a primary and a secondary coil upon each of several legs, the primary coils being series connected in pairs, of two rectifying devices supplied from the secondary windings of the transformers.

7. The combination with two transformers each comprising a core having a plurality of legs, and a leakage path, and a primary and a secondary coil upon each of several legs, the primary coils being series connected in pairs, of two rectifying devices each of which is supplied from a secondary winding of each transformer.

8. The combination with two transformers each comprising two sets of primary and secondary coils, the mutual inductance between coils of the same set being greater than that between coils belonging to different sets, the primary coils being series connected in pairs, with one coil of each transformer in each pair, of two rectifying devices that are supplied from the secondary windings of the transformers.

9. The combination with two transformers each comprising two sets of primary and secondary coils, the mutual inductance between coils of the same set being greater than that between coils belonging to different sets, the primary coils being series connected in pairs, with one coil of each transformer in each pair, of two rectifying devices each of which is supplied from a secondary winding of each transformer.

In testimony whereof, I have hereunto subscribed my name this 17th day of June, 1912.

FRANK CONRAD.

Witnesses:
 WM. M. BRADSHAW,
 B. B. HINES.